June 24, 1969  R. R. THOMPSON ET AL  3,452,246
CATHODE RAY TUBES
Filed June 12, 1967

Inventors:
Roger Ross Thompson
and
Roger Ball
BY Baldwin Wight Diller & Brown
ATTORNEYS

United States Patent Office 3,452,246
Patented June 24, 1969

3,452,246
CATHODE RAY TUBES
Roger Ross Thompson and Roger Ball, Essex, England, assignors to English Electric Valve Company Limited, London, England, a British company
Filed June 12, 1967, Ser. No. 645,553
Claims priority, application Great Britain, June 17, 1966, 27,145/66
Int. Cl. H01j 29/56
U.S. Cl. 315—31           6 Claims

ABSTRACT OF THE DISCLOSURE

A cathode ray tube having in addition to the normally provided cathode, control grid and anode, an additional apertured electrode interposed between the control grid and the cathode so as to limit the effective emission area of the cathode to a relatively small area from which a substantially parallel beam is emitted.

---

This invention relates to cathode ray tubes, an expression which is employed in this specification in a broad sense to include any electron discharge tube having an electron gun adapted and intended to project a narrow sharply defined electron beam to form a small defined, electron beam spot. In the commonest form of cathode ray tube—a display cathode ray tube or oscilloscope tube—the cathode ray forms an electron beam spot on a fluorescent screen at the end of the tube remote from the gun, but there are, of course, other well known forms of cathode ray tube e.g. television camera tubes. The invention relates particularly to the electron guns of cathode ray tubes and its main object is to provide improved electron guns which will give smaller and more precisely defined electron beam spots at higher values of beam current than are obtainable in tubes employing the usual known forms of electron gun.

Figure 1:
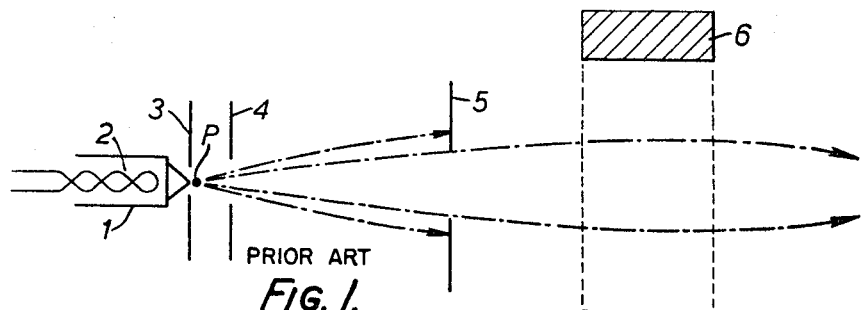
Figure 2:
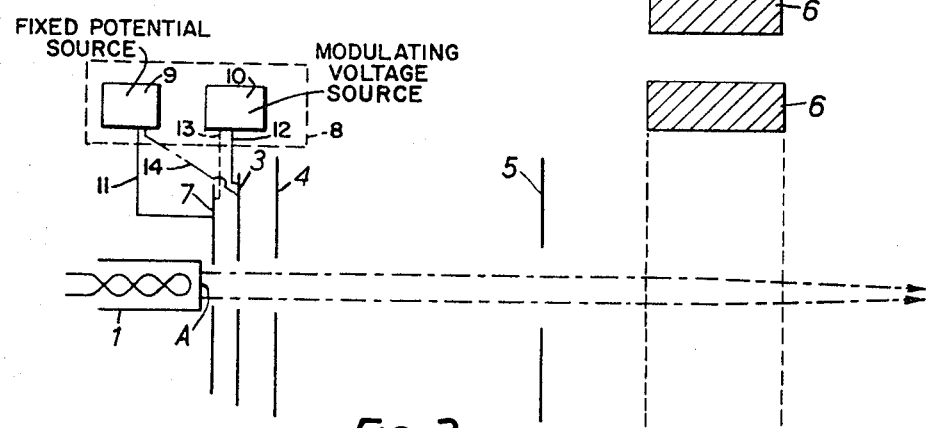
Figure 3:
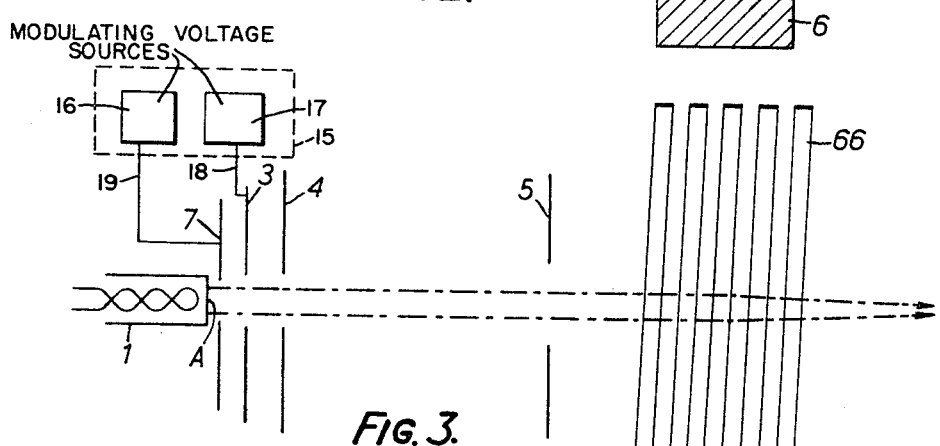

The invention is illustrated in and further explained in connection with the accompanying drawings in which FIGURE 1, which is provided for the purposes of explanation, diagrammatically represents a cathode ray tube electron gun arrangement as at present known and in common use for many years; FIGURE 2 is a similar diagrammatic representation of an improved gun arrangement in accordance with the invention; and FIGURE 3 shows a preferred modification.

The well known gun arrangement of FIGURE 1 comprises a cathode 1, heated by an electrical heater 2, a so-called grid 3 (hereinafter termed the control grid) having a small aperture, and an apertured anode 4. There is a further apertured electrode 5 the aperture in which is usually called the "trimming" aperture. The portion of the beam which passes through the aperture in electrode 5 is converged on to the final spot (not shown) by a converging lens system. which may be electro-static or magnetic, and is represented diagrammatically at 6.

In this known arrangement the electrodes are so positioned and operated at such relative potentials that there is a cross-over point P of electron trajectories. This cross-over P occurs in the vicinity of the aperture in the control grid 3 and an image of this cross-over is projected by the converging lens to form the spot (not shown) e.g. the spot on a phosphor screen. This cross-over P is an area of least confusion and, so long as the current drawn from the cathode is reasonably small, it has a small diameter and a satisfactorily small, well-defined spot is obtained on the screen (in the case of an oscilloscope or display tube). In other words the spot is such as to give the tube adequately good resolution. If, however, larger currents are drawn from larger areas of the cathode, there is a considerable increase in the area of the cross-over, the spot becomes larger and less well-defined and there is consequent degradation of resolution. This is a serious defect which it is the object of the present invention to avoid.

According to this invention a cathode ray tube is provided with an electron gun having, in addition to the normally provided cathode, control grid and anode, an additional apertured electrode interposed between said control grid and said cathode.

In carrying out the invention the additional apertured electrode is so positioned, and the aperture therein is so dimensioned, that, when appropriate relative operating potentials are applied to the various electrodes of the gun, the aperture in the additional apertured electrode effectively limits the area of electron emission of the cathode and the electron trajectories from this limited area run substantially parallel and do not cross one another. Accordingly, due mainly to the effective limitation of the cathode emission area, a precisely defined small spot can be obtained at high electron beam current values because, unlike the known arrangement of FIGURE 1, increase of beam current does not result in an increase of area of a cross-over which is imaged to form the spot.

A practical advantage of the invention is that an electron gun in accordance therewith is easy to manufacture by the factory methods normally employed in making known electron guns, for the provision of the additional apertured electrode does not involve any difficult methods of jigging to ensure that the cathode and the other electrodes are accurately aligned, as is of course, necessary. The methods of jigging normally used in factory manufacture of known electron guns are adequate for making electron guns in accordance with this invention.

The additional apertured electrode provided by the invention—this electrode may conveniently be termed the "limiting grid"—is not very critical as regards that voltage to be applied to it when the tube is in use and in the normal case of an oscilloscope or display tube, may be operated over a voltage range of about −10 to +10 volts in relation to the cathode. Its presence will, of course, affect the grid current characteristic of the control grid of the electron gun. This, however, constitutes an additional practical advantage because it enables the grid bias of the electron gun to be adjusted by adjusting the potential applied to the limiting grid so that the beam current obtainable with zero bias on the control grid may be adjusted over a wide range.

In general use a tube in accordance with this invention will be operated with a fixed potential applied to the limiting grid and required modulating potential applied to the control grid. However, it may, in some cases, be advantageous to modulate the potential applied to the limiting grid instead of, or even as well as, modulating the potential on the control grid.

FIG. 2 shows one embodiment of the present invention. As like references are used for like parts in FIGURES 1 and 2 the latter figure will be found almost self-explanatory. The essential difference between FIGURES 1 and 2 lies in the provision, in FIGURE 2, of the limiting grid 7. When the tube is in use the aperture in grid 7 effectively limits the area of the cathode from which electron emission takes place to a relatively small area A and electrons from this limited area follow substantially parallel paths through the electrodes of the gun. Accordingly, at all values of electron beam current, including the highest values the tube can provide, it is the aperture in the grid 7 which determines the diameter of the effective emission area of the cathode.

It will be understood, of course, that the final spot obtained with a tube as illustrated by FIGURE 2 will normally be a good deal smaller in area than the limited area of emission of the cathode and that the lens system 6 provides the small amount of convergence necessary to focus the electrons on to the very small final spot.

In some cases the velocity of the electrons reaching the final spot in a tube as shown in FIGURE 2 may be less than is, for practical purposes, required. FIGURE 3 shows an embodiment which is preferred for those tubes in which a high final electron velocity is required—notably for tubes in which the final spot is on a phosphor screen— and in which this defect is overcome by providing a lens system which also acts as an electron accelerator. In FIGURE 3 the lens systems, referenced 66, is constituted by a helix of conductive material, e.g. of carbon, deposited on the interior of the (presumed) cylindrical envelope (not shown) of the tube. In tubes in which the envelope is conical the lens system may be constituted by a spiro-helical conductive deposit. A suitable current is, of course passed through the accelerator-lens system.

In FIGURES 2 and 3 the electron beam leaving the restricted emission area of the cathode is shown as a parallel beam. This is, of course, the ideal case. In practice a trifle of beam divergence will almost always occur.

The application of fixed and varying potentials to the limiting grid 7 and control grid 3, as discussed hereinabove, is illustrated in FIGURES 2 and 3. In FIGURE 2 there is generally schematically illustrated an operating circuit 8 including a source of fixed potential 9 and a source of modulating voltage 10. As set forth hereinabove, in general operation the limiting grid 7 may have the fixed potential from the source 9 applied thereto as by the connection 11 and the control grid 3 ordinarily will have a modulating voltage applied thereto from the modulating voltage source 10 via a connection 12. Where modulation of the voltage applied to the limiting grid 7 is desired, the source 10 may be connected thereto as by the broken-line connection 13 illustrated in FIGURE 2 and the control grid 3 may have applied thereto the fixed potential from the source 9 via the broken line connection 14, again illustrated in FIGURE 2. As illustrated in FIGURE 3 an operating circuit 15 may be employed including first and second modulating voltage sources 16, 17, respectively, applying modulating voltages to both grid 3 and grid 7 via the connections 18, 19, respectively.

What we claim is:

1. A cathode ray tube including a cathode for emitting an electron beam along a path, a control grid and an anode both spaced from said cathode along said path, additional apertured electrode means between said control grid and cathode and adjacent said cathode for limiting the area of cathode emission to a relatively small area and for providing substantially parallel electron movement along said path, and electron focussing and accelerating lens means for focussing electrons in transit along said path to a relatively small spot and for accelerating the electrons during movement on said path, said electron focussing and accelerating lens means being constituted by a conductive winding which is co-axial with the tube and surrounds the electron beam path.

2. A tube as claimed in claim 1 wherein the winding is in the form of a conductive deposit on the inside of the tube envelope.

3. In combination a tube as claimed in claim 2 and an operating circuit including means for applying to the additional apertured electrode means a voltage of between ±10 volts in relation to the cathode.

4. In combination a tube as claimed in claim 2 and an operating circuit including means for applying a predetermined fixed potential to the apertured electrode means and means for applying a modulating potential to the control grid, both in relation to the cathode.

5. In combination a tube as claimed in claim 2 and an operating circuit including means for applying a predetermined fixed potential to the control grid and means for applying a modulating potential to the additional apertured electrode means, both in relation to the cathode.

6. In combination a tube as claimed in claim 2 and an operating circuit including means for applying modulating potentials to the additional apertured electrode means and to the control grid, both in relation to the cathode.

References Cited

UNITED STATES PATENTS

| | | | |
|---|---|---|---|
| 2,122,990 | 7/1938 | Poch | 315—30 |
| 2,995,676 | 8/1961 | Schlesinger | 315—30 X |
| 3,141,993 | 7/1964 | Hahn | 315—31 |
| 3,179,844 | 4/1965 | Harries | 315—31 |
| 3,215,890 | 11/1965 | Blum | 315—31 |
| 3,225,248 | 12/1965 | Scheffels | 315—31 |

RICHARD A. FARLEY, *Primary Examiner.*

RICHARD E. BERGER, *Assistant Examiner.*

U.S. Cl. X.R.

313—85